(12) United States Patent
Busaba et al.

(10) Patent No.: US 7,376,890 B2
(45) Date of Patent: May 20, 2008

(54) METHOD AND SYSTEM FOR CHECKING ROTATE, SHIFT AND SIGN EXTENSION FUNCTIONS USING A MODULO FUNCTION

(75) Inventors: Fadi Y. Busaba, Poughkeepsie, NY (US); Lawrence Joseph Powell, Round Rock, TX (US); Martin Stanley Schmookler, Austin, TX (US); Michael Thomas Vaden, Austin, TX (US); David Allan Webber, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 10/855,734

(22) Filed: May 27, 2004

(65) Prior Publication Data

US 2005/0278572 A1  Dec. 15, 2005

(51) Int. Cl.
G06F 11/10 (2006.01)
(52) U.S. Cl. .......................... 714/808; 712/26
(58) Field of Classification Search ............... 708/530, 708/532; 714/49, 2, 3; 712/26
See application file for complete search history.

(56) References Cited

U.S. PATENT DOCUMENTS

| 2,837,278 | A | * | 6/1958 | Schreiner et al. | 708/532 |
| 2,919,854 | A | * | 1/1960 | Singman | 708/532 |
| 3,137,788 | A | * | 6/1964 | Froggatt | 708/532 |
| 5,742,533 | A | * | 4/1998 | Moncsko | 708/530 |
| 2004/0044525 | A1 | * | 3/2004 | Vinton et al. | 704/224 |

\* cited by examiner

Primary Examiner—Guy Lamarre
Assistant Examiner—Sam Rizk
(74) Attorney, Agent, or Firm—Casimer K. Salys; Dillon & Yudell LLP

(57) ABSTRACT

A method of discovering a fault in a circuit is disclosed. The method comprises generating a first result of a selected function by performing the selected function on an operand, wherein the selected function employs a mask. Once the function is performed, an antimask of the mask is created, and the modulo of the antimask is calculated. A modulo function of the first result of the selected function is calculated to obtain a third result. A modulo of the operand is then calculated to obtain a fourth result, and a second function is then performed on the second result and the third result to obtain a fifth result. In response to comparing the fifth result to the fourth result, a signal is propagated to indicate a fault in the circuit.

10 Claims, 4 Drawing Sheets

METHOD AND SYSTEM FOR CHECKING ROTATE, SHIFT AND SIGN EXTENSION FUNCTIONS USING A MODULO FUNCTION

BACKGROUND OF THE INVENTION

1. Technical Field

The present invention relates in general to an improved method of error detection, and, in particular, to an improved method of discovering errors in a logical function. Still more particularly, the present invention relates to an improved method for discovering errors in shift, rotate, and sign extension functions.

2. Description of the Related Art

With the increasing penetration of microprocessor-based systems into every facet of human activity, demands have increased on the microprocessor development and production community to produce systems that are free from data corruption. Microprocessors have become involved in the performance of a vast array of critical functions, and the involvement of microprocessors in the important tasks of daily life has heightened the expectation of reliability of calculative results. Whether the impact of errors would be measured in human lives or in mere dollars and cents, consumers of microprocessors have lost tolerance for error-prone results. Consumers will not tolerate, by way of example, miscalculations on the floor of the stock exchange, in the medical devices that support human life, or in the computers that control their automobiles. All of these activities represent areas where the need for reliable microprocessor results has risen to a mission-critical concern.

In applications where reliability is considered paramount, designers commonly employ duplicate logic to perform calculations twice (in parallel) and compare the results of the duplicated function. This allows a microprocessor system to detect circuit failure, and to prevent an internal error from fouling the results of a calculation. As can be easily imagined, there is an inherent inefficiency in duplication of a function. Simply stated, the duplication of a function doubles the circuitry necessary to perform a given calculation, resulting in increased design complexity and chip size. Fabrication costs, design time, power consumption, and the potential for errors all increase with the amount of circuitry on a chip.

The complexity, power consumption, and cost associated with conventional error checking techniques have motivated the use of cheaper alternatives. For example, one alternative method of checking for circuit failure and mathematical calculation errors, without having to duplicate logic, is moduli or residue checking. The modulo function has proven useful for streamlining error-checking operations, but its applicability conventionally is limited by the methods that are conventionally used to calculate it.

The modulo operator (mod) returns the remainder after integer division of its first argument by its second. If a is any integer and n is a positive integer, a mod n is the expression for the remainder in $\{0, \ldots, n-1\}$ that occurs if a is divided by n. For instance, 23 mod 12=11. As another example, a mod 12 is performed to convert the time from a 24-hour format to a 12-hour format.

In practice, x mod y can be calculated in terms of other functions. Differences arise according to the scope of the variables, which in common implementations is broader than in the definition just given. In terms of the floor function floor(z), the greatest integer less than or equal to z: x mod y=x−y*floor(x/y). In terms of truncation to the integer part (known as remain( ) on several calculators and always positive; performed by C's built-in % operator): x mod y=x−y*iPart(x/y). In the case of floor, a negative divisor results in a negative modulus (for example, under this definition, 1 mod −2=−1). The resulting function is what is known as mod( ) on calculators and is implemented in some high-level languages, including Perl. Perl also uses the % operator to indicate a modulus operation, alluding to the /division operator. Both definitions allow for x and y to be typed as integers or rational numbers. Each of these definitions requires the preservation of the operands of the original function to be checked.

As a practical matter, modulo functions have proven useful in error checking without function duplication for functions whose operands are not discarded during calculation. However, conventional modulo/residue checking is available only where both the input of a function and the result of a function are available after the function is complete. Accordingly, conventional modulo/residue checking cannot be used to check rotate, sign extend, or shift functions, because their operands are discarded or altered in the course of the underlying operation. Storage of the operands of a function for later calculation of a modulo check would involve a waste of resources in terms of complexity, power consumption, and cost. Thus, storage of operands would cause problems unacceptably similar to the problems presented by duplicating a function and comparing the two results.

What is needed is a method for detecting errors in a processor that performs shift, rotate, and sign extension functions, with that method using the modulo function to detect errors.

SUMMARY OF THE INVENTION

A method of detecting a fault in a circuit is disclosed. The method comprises generating a first result of a selected function by performing the selected function on an operand, wherein the selected function employs a mask. Once the function is performed, an antimask of the mask is created, and the modulo of the result created by employing the antimask is calculated. A modulo function of the first result of the selected function is calculated to obtain a third result. A modulo of the operand is then calculated to obtain a fourth result, and a second function is then performed on the second result and the third result to obtain a fifth result. In response to comparing the fifth result to the fourth result, a signal is propagated to indicate the presence of a fault in the circuit.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

A preferred embodiment of the present invention provides for the error-checking of circuits for performing rotate, sign extend, and shift functions within a binary processor by employing the mathematical relationship of residue. Advantages of the preferred embodiment include the ability to expose the failure of a circuit or circuit component without resorting to duplication of a function and comparison of results.

The checking methodology of a preferred embodiment includes the calculation of an antimask term. An antimask value contains information that is not needed in producing the result of a function but is needed to insure all data that went into executing the instruction is preserved, without resorting to the more resource intensive storage of operands. Without an antimask term, conventional modulo-based error checking is not preferable for rotate, sign extend, and shift functions because conventional modulo-based error checking requires that an operand be preserved to the time for error-checking.

In a preferred embodiment of the present invention as presented below, the modulo 3 function is used to check a logical function. While the preferred embodiment employs the modulo 3 function, it will be appreciated that other embodiments, using modulo functions with different divisor values, may also be used to check a logical function without departing from the scope and spirit of the present invention.

Figure 1:
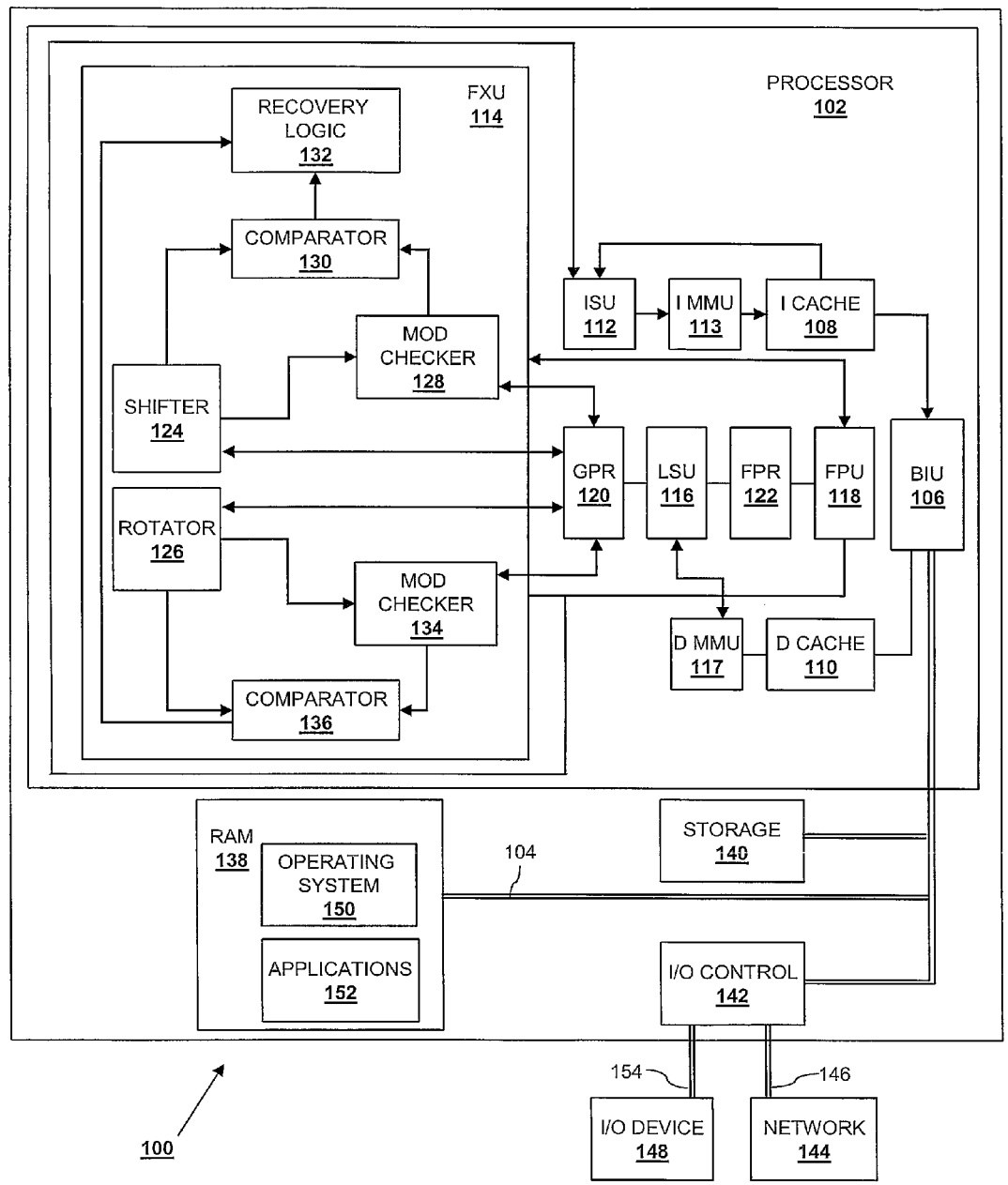
FIG. 1 is a block diagram of a data processing system equipped with an error-detection apparatus, in accordance with a preferred embodiment of the present invention.

With reference now to the figures, and in particular with reference to FIG. 1, a block diagram of a data processing system equipped with an error-detection apparatus, in accordance with a preferred embodiment of the present invention, is illustrated. For purpose of simplicity in explanation, many components of a data processing system have been omitted from FIG. 1, and only those parts that facilitate an understanding of the invention have been included. All components of a data processing system that have been omitted from FIG. 1 are well known to those skilled in the data processing arts at the time of the invention, though other substitute components may later be developed and substituted without departing from the scope of the present invention.

FIG. 1 is a block diagram of a data processing system 100 for processing information according to a preferred embodiment of the present invention. In the preferred embodiment depicted in FIG. 1, processor 102 is a single integrated circuit superscalar microprocessor, such as one of the line of Power processors from IBM Corporation of Armonk, N.Y. Accordingly, as discussed further herein below, processor 102 includes various units, registers, buffers, memories, and other sections, all of which are formed by integrated circuitry. Also, in the preferred embodiment, processor 102 operates according to reduced instruction set computing ("RISC") techniques. As shown in FIG. 1, a system bus 104 is connected to a bus interface unit ("BIU") 106 of processor 102. BIU 106 controls the transfer of information between processor 102 and system bus 104.

BIU 106 is connected to an instruction cache ("I CACHE") 108 and to a data cache ("D CACHE") 110 of processor 102. Instruction cache 108 outputs instructions to an instruction sequencer unit ("ISU") 112, and receives instructions from ISU 112 through an instruction memory management unit ("I MMU") 113. I MMU 113 provides mapping between logical and actual memory addresses for instructions coming from ISU 112. In response to such instructions from instruction cache 108, instruction sequencer unit 112 selectively outputs instructions to other execution circuitry of processor 102.

In addition to instruction sequencer unit 112, the execution circuitry of processor 102 includes multiple execution units, namely a fixed point unit ("FXU") 114, for executing fixed-point arithmetic instructions, a load/store unit ("LSU") 116, for executing load and store instructions, and a floating point unit ("FPU") 118 for executing floating-point arithmetic and logical instructions. FXU 114 and LSU 116 input their source operand information from architectural general purpose registers ("GPRs") 120 and a fixed point rename buffer ("FPR") 122. FXU 114 and LSU 116 output results (destination operand information) of their operations for storage at selected entries in FPR 122. LSU 116 also outputs results to data memory management unit ("D MMU"), which provides mapping between logical and actual memory address before output from LSU 116 is received by D CACHE 110.

Within FXU 114, which executes fixed-point arithmetic instructions, several components provide for the error-checking of circuits for performing rotate, sign extend, and shift functions within a binary processor by employing the mathematical relationship of residue. Additional components of FXU 114, which are well known to those skilled in the art and are not necessary to understanding the operation of the preferred embodiment of the present invention, are not shown in FIG. 1 for purposes of simplicity.

Shifter 124 performs shift functions on operands received from GPR 120. Shifter 124 outputs the results of shift functions, as well as mask terms when appropriate, to GPR 120, to modulo-based function checker ("MOD CHECKER") 128, and to comparator 130. The results generated by comparator 130 are output to recovery logic 132. Though, in the preferred embodiment as shown in FIG. 1, recovery logic 132 is depicted as a component of FXU 114, alternative embodiments may place recovery logic 132 in another component of processor 102.

Similarly, rotator 126 performs rotate functions on operands received from GPR 120. Rotator 126 outputs the results of rotate functions, as well as mask terms when appropriate, to GPR 120, to modulo-based function checker ("MOD CHECKER") 134, and to comparator 136. The results generated by comparator 136 are output to recovery logic 132.

Data processing system 100 also contains a processing storage unit or a RAM 138. Within RAM 138, data processing system 100 stores data and instructions while operating in accordance with a preferred embodiment of the present invention. For example, RAM 138 may store an operating system 150 and application programs 152. Data processing system 100 also includes a non-volatile storage 140 such as a hard disk drive or other direct access storage device. An Input/Output (I/O) control unit 142 provides wireless or wired connectivity to a network 144 through, for example, a connectivity device such as a network cable 146. I/O controller 142 also connects to one or more I/O devices 148, such as a keyboard, mouse, display, or printer through a wired or wireless link 154. System bus 104 couples processor 102, RAM 138, storage 140, and I/O control unit 142 for communication.

Processor 102 executes programs in the course of performing the present invention. FXU 114 within processor 102 performs a litany of mathematical calculations including binary shift, binary merge, binary rotate functions, and other related functions. FXU 114 also performs, in a preferred embodiment of the present invention, modulo and residue functions.

In a preferred embodiment of the present invention as depicted FIG. 1, the method of the present invention is performed within processor 102. As a summary of the method of the present invention, rotator 126 performs on an operand a selected function embodied by a rotate, shift or sign extend instruction, or a selected function employing a derivative of one or more of a rotate, shift or a sign extend instruction. The command embodying the selected function will generally be received by rotator 126 from ISU 112. The selected function employs a mask. In order to check the result of the selected function, FXU 114 generates an antimask of the mask used in the selected function, and the modulo of the antimask is calculated. A modulo 3 function of the result of the selected function is calculated to obtain a third result. A modulo 3 of the operand is then calculated to obtain a fourth result, and a second function, which will typically include a sum, is then performed on the second result and the third result to obtain a fifth result. In response to comparing the fifth result to the fourth result, a signal is propagated to indicate a fault in the circuit.

Figure 2:
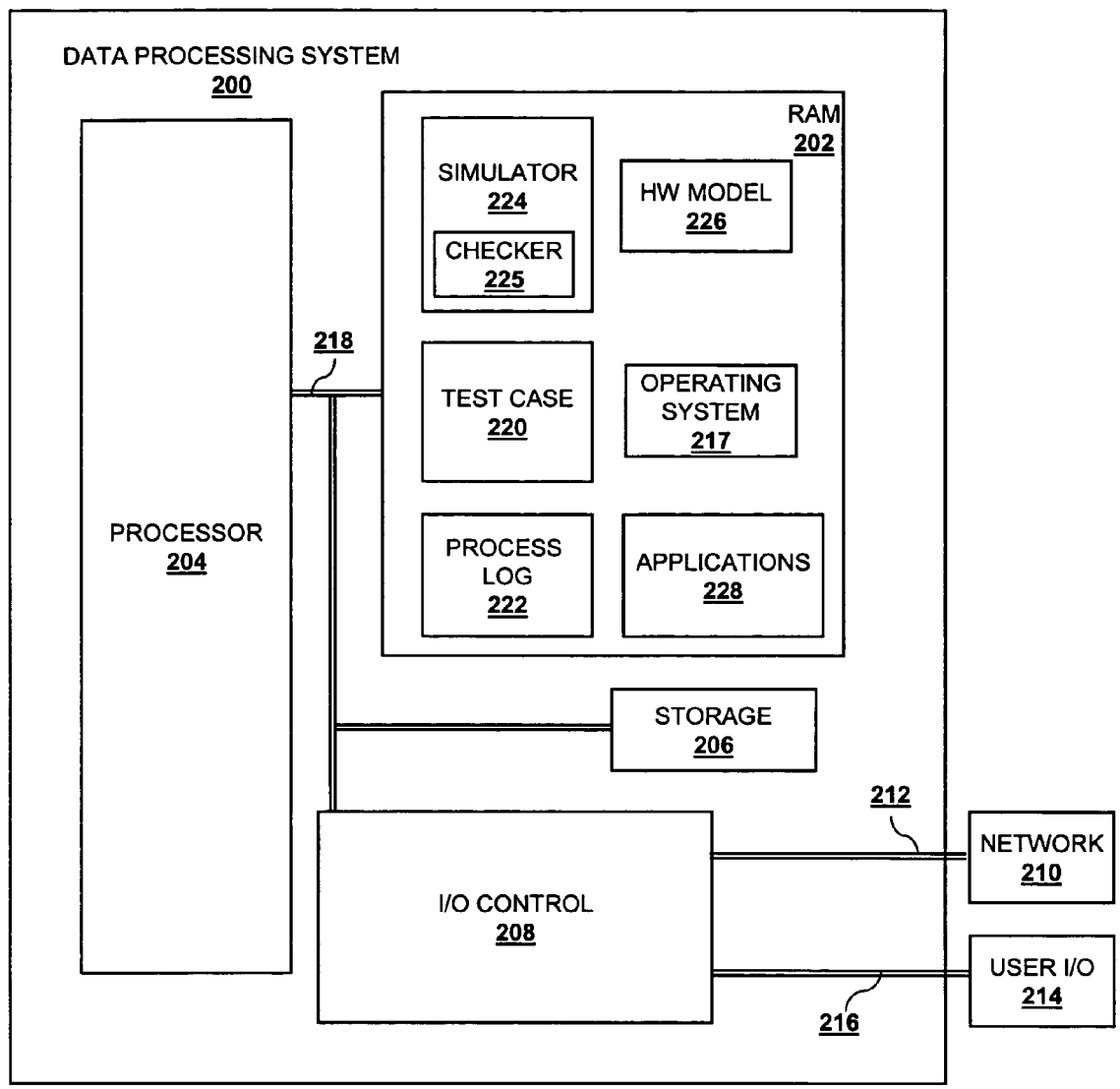
FIG. 2 is a block diagram of a data processing system equipped with a behavior-simulation program and error detection apparatus for modeling a data processing system, in accordance with a preferred embodiment of the present invention.

Turning now to FIG. 2, a block diagram of a data processing system equipped with a behavior-simulation environment program and containing an error-detection apparatus for modeling a data processing system, in accordance with a preferred embodiment of the present invention, is depicted. A data processing system 200 contains a processing storage unit (e.g., RAM 202) and a processor 204. Data processing system 200 also includes non-volatile storage 206 such as a hard disk drive or other direct access storage device. An Input/Output (I/O) controller ("I/O CONTROL") 208 provides connectivity to a network 210 through a wired or wireless link, such as a network cable 212. I/O controller 208 connects to user I/O devices 214 such as a keyboard, a display device, a mouse, or a printer through wired or wireless link 216, such as cables or a radio-frequency connection. System bus 218 connects processor 204, RAM 202, storage 206, and I/O controller 208.

Within RAM 202, data processing system 200 stores several items of data and instructions, while operating in accordance with a preferred embodiment of the present invention. These include a test case 220, a hardware model ("HW model") 226 and a process log 222 for interaction with a simulator 224, containing a modulo checker 225. Other applications 228 and simulator 224 interface with processor 204, RAM 202, I/O control 208, and storage 206 through operating system 217. One skilled in the data processing arts will quickly realize that additional components of data processing system 200 may be added to or substituted for those shown without departing from the scope of the present invention.

Processor 204 executes instructions from programs, often stored in RAM 202, in the course of performing the present invention. In a preferred embodiment of the present invention, processor 204 executes simulator 224. Simulator 224 calls for the execution of instructions contained in hardware model 226, which contains instructions for modeling a simulated processor.

Simulator 224 includes a computer program product, stored in RAM 102 and executed on processor 204, which provides a series of tools for behavior-simulation testing. Generally speaking, simulator 224 contains rule-based instructions for predicting the behavior of logically or mathematically modeled items of hardware and software. Simulator 224 uses the series of rules contained in its own instructions, in conjunction with hardware model 226, to predict the response of hardware model 226 to external and internal stimuli contained in test case 220, which contains error codes and debug instructions.

Depending on what items of hardware are under test, hardware model 226 may model the designs of many different kinds of hardware, but preferably provides a software representation of components such as microprocessors and application specific integrated circuits (ASIC)s. In the preferred embodiment depicted in FIG. 2, hardware model 226 includes a simulated processor, which one skilled in the art will realize may contain simulated components similar to those described with respect to FIG. 1.

Simulator 224 records results of the interaction of hardware model 226 with external and internal stimuli contained in test case 220 to process log 222, a result recording file. Simulator 224 may also report the contents of process log 222 or the status selected indicators of the status of hardware model 226 to user I/O 214. Additionally, all or part of simulator 224, operating system 217, test case 220, hardware model 226, and process log 222 may, at times, be stored in storage 206 or in RAM 202.

In a preferred embodiment of the present invention as depicted in FIG. 2, the method of the present invention is performed primarily within processor 204. As a summary of the method of the present invention as depicted in FIG. 2, a simulated processor within hardware model 226 models performance of a selected function on an operand. The selected function will comprise a rotate, shift or sign extend instruction, or an instruction employing a derivative of one or more of a rotate, shift or a sign extend instruction, based on a command that is received from test case 220. The selected function employs a mask. In order to check the result of the selected function, processor 204 generates an antimask of the mask used in the selected function, and the modulo 3 of the antimask is calculated by processor 204. A modulo 3 function of the result of the selected function is calculated by processor 204 to obtain a third result. A modulo 3 of the operand is then calculated by processor 204 to obtain a fourth result, and a second function, which will typically comprise a sum, is then performed by processor 204 on the second result and the third result to obtain a fifth result. In response to processor 204 comparing the fifth result to the fourth result, a signal is propagated by processor 204 to process log 222 or user I/O 214 to indicate a fault in the simulated hardware of hardware model 226.

A preferred embodiment allows for the checking of rotate functions. When an operand of an even number of bits is rotated, without any other function being performed, all data provided in the operand is available in the result. Generally, the bit positions change, assuming a rotate value greater than 0 and less then the operand bit width, but no data is lost. Therefore, a preferred embodiment of the present invention performs checking of a rotate to insure that data was not lost during the rotate, using Residue 3, with the following equation:

*R3Ra=R3Result+R3Antimask

In a preferred embodiment, R3Ra is the modulo 3 of the operand and R3Result is the modulo 3 of the output. Because modulo 3 is used in a preferred embodiment, the data will typically be viewed as bit pairs. As long as the rotate amount was even, each bit pair of the operand will reside in the same relative 2-bit binary position in the result.

In the preferred embodiment, however, there is another possibility that is taken into consideration. When the rotate amount is odd, the relative 2-bit binary position of the bit pairs in the result will be opposite the position of the same bit pair in the operand. Therefore, a preferred embodiment will invert the R3Ra value when the rotate amount is odd. The ability to invert the R3Ra value in response to an odd rotate amount is identified by the "*" next to R3Ra in the equation given above, and in subsequent equations given below. In a preferred embodiment, the mask is ANDed with the operand to produce the result of the rotate while the inversion of the mask is ANDed with the operand to produce the antimask. Note that the antimask term is not needed in a normal rotate, and, in a preferred embodiment, all data input to the rotate function is available in the result.

An example of a preferred embodiment rotating an eight-bit operand by five bits is now presented; however, the fault detection equation for the rotate function is equally applicable to even operands and rotations. In the examples provided to explain a preferred embodiment of the present invention, the notation '~' preceding a value or a variable indicates a binary inversion of the value or variable. Hence, '~Mask' represents the inversion of the mask term. In the following example, the operand '10110011' is rotated.

| | |
|---|---|
| 10110011 R3Ra = 2 | 10110011 R3Ra = 2 |
| 10011101 rotate right 5 | 10011101 rotate right 5 |
| 11111111 Mask | 00000000 ~Mask |
| 10011101 R3Result = 1 | 00000000 R3antimask = 0 |

In the example given above, a preferred embodiment will invert R3Ra because the length of the shift is odd. Therefore: *R3Ra=~2=1. R3Result+R3antimask=1+0=1. In practice in a microprocessor system, that the equation *R3Ra=R3Result+R3Antimask produces equal results on both sides of the equation would indicate that the circuit verified by the *R3Ra=R3Result+R3Antimask equation has performed properly and is not corrupted.

A preferred embodiment allows for the checking of shift functions. When a shift of an operand is performed in accordance with the present invention, data that was present in the operand is shifted out and is not present in the result. Using residue to check that the shift was performed correctly requires that the entire operand be available for checking. To accommodate this requirement, a preferred embodiment of the present invention performs a shift using a rotator, instead of a true shifter, and masks off the unwanted data. The masked off data is stored as an antimask result, which is that portion of the operand that would normally be dropped when shifting. A preferred embodiment uses the inverted mask to create the antimask value. By storing the antimask and using it in an error checking calculation, a preferred embodiment of the present invention can use residue to determine if any data was lost during the shift. As in the rotate example discussed above, data loss can be detected.

An example of a preferred embodiment shifting an eight-bit operand by five bits is now presented; however, the fault detection equation for the rotate function is equally applicable to even operands and rotations. In the following example, the operand '10110011' is shifted.

*R3Ra=R3Result+R3antimask

| | |
|---|---|
| 10110011 R3Ra = 2 | 10110011 R3Ra = 2 |
| 10011101 rotate right 5 | 10011101 rotate right 5 |
| 00000111 Mask | 11111000 ~Mask |
| 00000101 R3Result = 2 | 10011000 R3antimask = 2 |

In the example given above, a preferred embodiment will invert R3Ra because the length of the shift is odd. Therefore: *R3a=~2=1. R3Result+R3antimask=1+0=1. Therefore: *R3Ra=~2=1. R3Result+R3antimask=2+2=4=1. In practice in a microprocessor system, that the equation *R3Ra=R3Result+R3Antimask produces equal results on both sides of the equation would indicate that the circuit verified by the *R3Ra=R3Result+R3Antimask equation has performed properly and is not corrupted.

A preferred embodiment of the present invention supports the checking of "rotate with merge" functions. "Rotate with merge" instructions produce a result, which is composed of data from two operands. One operand is rotated, and then merged, with another operand though a procedure that employs a mask to regulate the merge. A preferred embodiment of the present invention allows checking of this function by providing for both operands to be represented by residue/modulo functions. A preferred embodiment of the present invention allows checking of this function by providing for the data not used in the merge, from both operands, which is not part of the result, to be represented in the final checking equation. A preferred embodiment of the present invention creates an antimask value for each operand. The residue of the antimask values is also used as input to the checking equation.

An example of a preferred embodiment rotating an eight-bit operand by five bits and merging with eight bits is now presented; however, the fault detection equation for the rotate function is equally applicable to even operands and rotations. In the following example, the operand '10110011' is rotated merged with the operand '11100010'.

*R3RaA+R3Rb=R3RaResult+R3RbResult+
    R3Raantimask+R3Rbantimask

| | |
|---|---|
| 10110011 R3OpA = 2 | 11100010 R3Rb = 1 |
| 10011101 rotate Ra right 5 | 11100010 Rb not rotated |
| 11100000 Mask | 00011111 ~Mask |
| 10000000 RaResult | 00000010 RbResult = 2 |

Merging OpA and OpB=100000010=R3RaResult+R3RbResult=2+2=1

| | |
|---|---|
| 10110011 R3Ra = 2 | 11100010 R3Rb = 1 |
| 10011101 rotate Ra right 5 | 11100010 Rb not rotated |
| 00011111 ~Mask | 11100000 Mask |
| 00011101 R3Raantimask = 2 | 11100000 R3Rbantimask = 2 |

Therefore: ~R3Ra+R3Rb=~2+1=2.
R3RaResult+R3RbResult+R3Raantimask+
R3Rbantimask=2+2+2+2=8=2.

In practice in a microprocessor system, that the equation *R3RaA+R3Rb=R3RaResult+R3RbResult+ R3Raantimask+R3Rbantimask produces equal results on both sides of the equation would indicate that the circuit verified by the *R3RaA+R3Rb=R3RaResult+R3RbResult+ R3Raantimask+R3Rbantimask equation has performed properly and is not corrupted.

A preferred embodiment of the present invention allows for the checking of "rotate or shift with sign extend" functions. In a preferred embodiment of the present invention, sign extension is performed as a rotate with merge or a shift with merge. The merging operand serves, in a preferred embodiment, as the sign extension value. As such, the merging operand is created by replicating the sign bit across the entire bit width. So long as the operand is an even number of bits, the residue of the merging operand is always 0. The following equation can be used, again taking advantage of the antimask: *R3RaA+R3Se=R3RaResult+ R3SeResult+R3Raantimask+R3Rbantimask where Se stands for Sign Extend and is substituted for Rb in the rotate with merge equation.

An example of a preferred embodiment rotating an eight bit operand by five bits is now presented, but an even length binary string conforms to a preferred embodiment of the present invention. In the following example, the operand '10110011' is rotated.

| 10110011 R3OpA = 2 | 11111111 R3Se = 0 |
| 10011101 rotate Ra right 5 | Se not Rotated |
| 00000111 Mask | 11111000 ~Mask |
| 00000101 RaResult = 2 | 11111000 SeResult = 2 |

Merging Ra AND Se=11111101=R3RaResult+ R3SeResult=2+2=1

| 10110011 R3Ra = 2 | 11111111 R3Se = 1 |
| 10011101 rotate Ra right 5 | Se not Rotated |
| 11111000 ~Mask | 00000111 Mask |
| 10011000 R3RaAntimask = 2 | 00000111 R3Seantimask = 1 |

Therefore: ~R3Ra+R3Se=~2+0=1.
R3RaResult+R3SeResuLt+R3Raantimask+
R3Seantimask=2+2+2+1=7=1.

In practice in a microprocessor system, that the equation *R3RaA+R3Se=R3RaResult+R3SeResuIt+R3Raantimask+ R3Rbantimask produces equal results on both sides of the equation would indicate that the circuit verified by the *R3RaA+R3Se=R3RaResult+R3SeResuIt+R3Raantimask+ R3Rbantimask equation has performed properly and is not corrupted.

Figure 3:
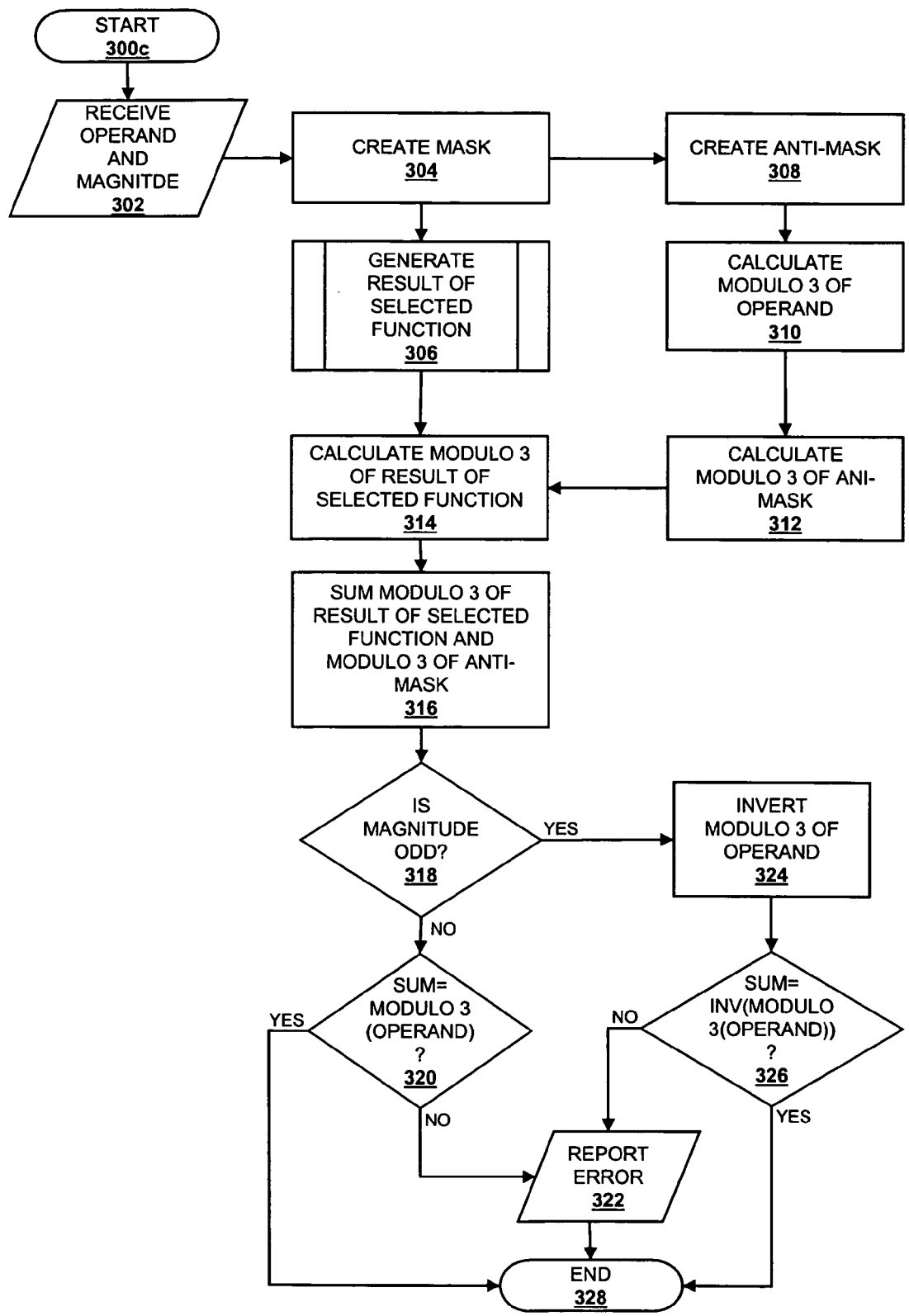
FIG. 3 is a high-level flowchart of a process for performing error detection, in accordance with a preferred embodiment of the present invention.

With reference now to FIG. 3, a high-level flow chart of a process for performing error detection, in accordance with a preferred embodiment of the present invention, is presented.

While FIG. 3 presents a high-level and generalized flowchart, which is explained below with respect to an example in which the data processing system of FIG. 1 performs and checks a rotate function as in the first example given above, one skilled in the art will quickly ascertain the modifications necessary for a preferred embodiment of the present invention in a data processing system environment as depicted in FIG. 2 or used for performing and checking functions represented by subsequent examples explained in this disclosure.

The process begins at step 300, which depicts activating an error-detection routine. This will typically happen when FXU 114 on processor 102 receives an instruction to perform a rotate function, a shift function, a rotate with merge function, or a rotate or shift with sign extend function. The process then proceeds to step 302, which illustrates FXU 114 receiving operand and magnitude. In a simple rotate or shift function, the operand will consist of a number upon which the selected function is to be performed, and a magnitude will consist of the number of bit positions of shift or rotation to be performed.

The process then moves to step 304, which depicts FXU 114 creating a mask. Creation of the mask is used in performance of the underlying mathematical operation and, additionally, in performing the method of error detection in the preferred embodiment of the present invention. The process then bifurcates and proceeds along two paths. The first of which, comprising block 306, will typically be performed on shifter 124 or rotator 126. The second path, which comprises steps 308-312, can be performed in shifter 124, in rotator 126 or in one of the set of mod checker 128 and mod checker 134 environment. In an environment such as data processing system 200 of FIG. 2, the first path can be performed by a simulated FXU in the simulated processor of hardware model 226, and the second path can be performed within simulator 224.

Referring now to step 306, FXU 114 or a simulated processor generates the result of the selected function. Meanwhile, an antimask is created at step 308 as is described above. For two-operand operations such as shift with merge functions, a multi-valued operand may be used. If that is the case, a modulo 3 of each operand value will be calculated, as is shown at step 310. Additionally, a mask and an antimask may be created in steps 304 and 308, respectively may be created for each operand value of a multi-valued operand. If this multi-valued operand is used, then the operand, mask, and antimask, can be represented as array-valued or vector-valued variables. The process then proceeds from step 310 to step 312, which depicts processor 102 or simulator 224 calculating a modulo 3 of the antimask, which may contain one or more values.

The two paths of the process then rejoin at step 314. Step 314 depicts a preferred embodiment of the present invention calculating a modulo 3 of the result of the selected function, which was generated in step 306. The process then proceeds to step 316, which depicts the preferred embodiment of the present invention taking a sum of the modulo 3 of the result of the selected function and a modulo 3 of the antimask. As is described in the above examples, these may also be vector or array valued variables and may involve functions more complicated than a simple arithmetic sum.

The process next moves to step 318, which depicts determining whether the magnitude of a shift or rotate operation is odd. If the magnitude of the shift or rotate operation is odd, the process next proceeds to step 324, which depicts inverting the modulo 3 of the operand received in step 302.

The process then moves to step 326, which illustrates determining whether the sum calculated in step 316 equals the inverse of the modulo 3 of the operand. If so, then the process terminates at step 328, without detecting or reporting an error. If, however, the sum taken in step 316 does not equal the inverse modulo 3 of the operand, then the process proceeds from step 326 to step 322, which depicts reporting an error in the result calculated at step 306. After step 322, the process terminates at step 328.

Returning to step 318, if the magnitude of the shift or rotate function is even, the process next proceeds to step 320, which depicts determining whether the sum calculated in step 316 is equal to the modulo 3 of the operand. If not, then the process next proceeds to step 322, which illustrates reporting an error, and thereafter terminates at step 328. If, on the other hand, a determination is made at block 320 that the sum obtained in step 316 equals the modulo 3 of the operand, then the process proceeds directly to step 328 and terminates without reporting an error.

For the purpose of clarity in explaining the preferred embodiment of the present invention, FIG. 3 presents a generalized and relatively linear depiction of a process for performing error detection. Those skilled in the art will recognize that FIG. 3 represents a logical ordering of steps, but the order in which steps may actually be performed in a preferred embodiment may differ substantially from FIG. 3 in order to facilitate efficient parallel processing or pipelined implementations of the preferred embodiment of the present invention. Various implementations of the invention may perform the steps depicted in another order, and may perform some of them in a parallel or pipelined arrangement without departing from the scope of the present invention. One such specific embodiment is depicted in FIG. 4.

Figure 4:
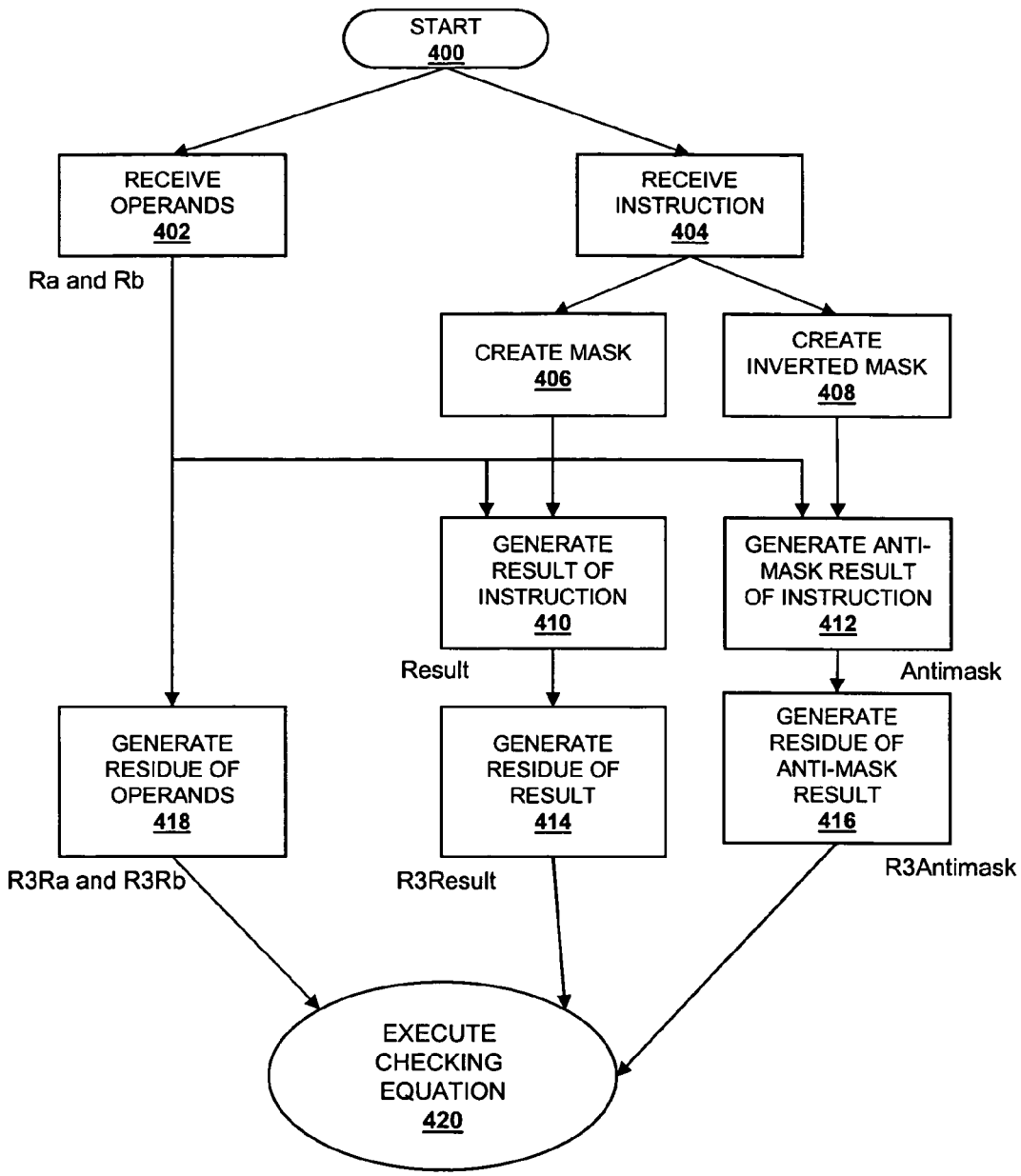
FIG. 4 is a high-level flowchart of a process for performing error detection in a parallel processing environment, in accordance with a preferred embodiment of the present invention.

With reference now to FIG. 4, a high-level flowchart of a process for performing error detection in a parallel processing environment, in accordance with a preferred embodiment of the present invention, is depicted. The process starts at block 400, where the process then bifurcates and proceeds along two paths. The first of which, comprising block 402 and 408, provides for the receiving of operands and the calculation of residue (modulo) values for the operand. The preferred embodiment receives the operands in block 402. The process then moves to block 418, which depicts the preferred embodiment generating residue values for each of the operands.

Along a parallel path, the process moves from block 400, where the process begins, to block 404, which depicts the preferred embodiment of the present invention receiving an instruction. This branch of the process then bifurcates and moves along two subsidiary paths performed concurrently. The first subsidiary path, comprising block 406, 410, and 414, culminates in the generation of a result of the instruction in block 414. The second subsidiary path, comprising blocks 408, 412, and 416, culminates in block 416, which represents generating the residue of an anti-mask result. All paths then converge to block 420, which represents the execution of a checking equation.

While the invention has been particularly shown as described with reference to a preferred embodiment, it will be understood by those skilled in the art that various changes in form and detail may be made therein without departing from the spirit and scope of the invention. For example although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD-ROMs and transmission type media such as analog or digital communications.

What is claimed is:

1. A computer-implemented method of discovering a fault in a circuit, said method comprising:

generating a first result of a selected function by performing said selected function on an operand, wherein said selected function employs a mask;

creating an antimask of said mask;

calculating a modulo function of said antimask to obtain a second result;

calculating a modulo function of said first result of said selected function to obtain a third result;

calculating a modulo function of said operand to obtain a fourth result;

performing a second function on said second result and said third result to obtain a fifth result;

in response to comparing said fifth result to said fourth result, propagating a signal within a computer to indicate a fault in said circuit.

2. The method of claim 1, wherein the said of generating said first result of said selected function further comprises performing at least one of the group consisting of a rotate operation and a shift operation.

3. The method of claim 1, wherein said step of calculating a modulo function of said antimask further comprises calculating a modulo 3 function of said antimask, wherein said step of calculating a modulo function of said first result of said selected function further comprises calculating a modulo 3 function of said first result of said selected function, and said step of calculating a modulo function of said operand further comprises calculating a modulo 3 function of said operand.

4. The method of claim 1, wherein said generating step further comprises generating said result of said selected function on a simulated hardware platform.

5. The method of claim 1, wherein said generating step further comprises generating said result of said selected function on a circuit in a hardware platform.

6. The method of claim 1, wherein said step of calculating said modulo function of said operand to obtain said fourth result further comprises:

calculating a modulo 3 of said operand; and in response to at least one of the set comprising an odd shift length and an odd rotate length, inverting said modulo 3 of said operand to generate said fourth result.

7. The method of claim 1, wherein said step of performing a second function on said second result and said third result to obtain a fifth result further comprises generating a sum of said second result and said third result to obtain a fifth result.

8. A computer-implemented method of discovering a fault in a circuit, said method comprising:

generating a first result of a selected function by performing said selected function on an operand, wherein said selected function employs a mask and wherein said selected function is at least one of the group consisting of a rotate operation and a shift operation;

creating an antimask of said mask;

calculating a modulo 3 function of said antimask to obtain a second result;

calculating a modulo 3 function of said first result of said selected function to obtain a third result;

in response to at least one of the set comprising an even shift length and an even rotate length, calculating a modulo 3 function of said operand to generate a fourth result;

in response to at least one of the set comprising an odd shift length and an odd rotate length, calculating an inverted modulo 3 function of said operand to generate said fourth result;

calculating a sum of said second result and said third result to obtain a fifth result;

in response to comparing said fifth result to said fourth result, and discovering that said fifth result does not equal said fourth result, propagating a signal within a computer to indicate a fault in said circuit.

9. The method of claim 8, wherein:

said step of generating a first result of a selected function by performing said selected function on an operand, wherein said selected function employs a mask, further comprises:

generating a first result of a rotate with merge function by performing said rotate with merge function on said operand, which operand comprises a first operand value and a second operand value, wherein said rotate with merge function employs a mask comprising a first mask value corresponding to said first operand value and a second mask value corresponding to said second operand value, and wherein said first result further comprises a final first result, a first intermediate result corresponding to a first operand value, and a second intermediate result corresponding to a second operand value;

the step of creating an antimask of said mask further comprises creating a first antimask of said first mask value and creating a second antimask of said second mask value;

the step of calculating a modulo function of said antimask to obtain a second result further comprises calculating a modulo 3 function of said first antimask and calculating a modulo 3 function of said second antimask to obtain a second result comprising said modulo 3 function of said second antimask and modulo 3 function of said first antimask;

the step calculating the modulo function of said first result of said selected function to obtain a third result further comprises calculating a first intermediate modulo by performing a modulo 3 function on said first intermediate result, calculating a second intermediate modulo by performing a modulo 3 function on said first intermediate result, and creating a third result comprising said first intermediate modulo and said second intermediate modulo;

the step of calculating a modulo function of said operand to obtain a fourth result further comprises:

calculating a modulo 3 function of said second operand value to obtain a fourth intermediate modulo, calculating a modulo 3 function of said first operand value, and, in response to an odd rotate length, inverting said modulo 3 of said operand to generate a third intermediate modulo, and taking a sum of said third intermediate modulo and said second intermediate modulo to obtain a fourth result; and the step of performing a second function on said second result and said third result to obtain a fifth result further comprises generating a sum of said modulo 3 function of said first antimask, said modulo 3 function of said second antimask, said first intermediate modulo and said second intermediate modulo.

10. The method of claim 9, wherein said step of generating a first result of a rotate with merge function further comprises generating a first result of a rotate with sign extend function.

* * * * *